United States Patent
Yamamoto (10) Patent No.: US 9,824,784 B2
(45) Date of Patent: Nov. 21, 2017

(54) PROTECTION BARRIER AND LASER IRRADIATION SYSTEM

(71) Applicant: Kazutaka Yamamoto, Kanagawa (JP)

(72) Inventor: Kazutaka Yamamoto, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 15/071,126

(22) Filed: Mar. 15, 2016

(65) Prior Publication Data

US 2016/0276047 A1  Sep. 22, 2016

(30) Foreign Application Priority Data

Mar. 16, 2015 (JP) ................ 2015-051967

(51) Int. Cl.
G21F 7/00 (2006.01)
B23K 26/12 (2014.01)
B41J 2/435 (2006.01)
B23K 26/70 (2014.01)

(52) U.S. Cl.
CPC .............. *G21F 7/00* (2013.01); *B23K 26/128* (2013.01); *B23K 26/706* (2015.10); *B41J 2/435* (2013.01)

(58) Field of Classification Search
CPC .. B41J 11/002; B41J 2/442; B41J 2002/4756; A61B 2018/2272; B23K 26/362; B23K 26/706
See application file for complete search history.

(56) References Cited

U.S. PATENT DOCUMENTS

| 3,407,272 | A | * | 10/1968 | Barocela | G03B 27/73 369/107 |
| 5,496,307 | A | * | 3/1996 | Daikuzono | A61B 18/24 606/15 |
| 6,717,896 | B1 | * | 4/2004 | Imanishi | B82Y 10/00 360/234.6 |
| 8,284,222 | B2 | | 10/2012 | Ishimi et al. | |
| 8,358,325 | B2 | | 1/2013 | Asai et al. | |
| 8,471,885 | B2 | | 6/2013 | Ishimi et al. | |
| 8,598,074 | B2 | | 12/2013 | Kawahara et al. | |
| 8,633,958 | B2 | | 1/2014 | Kawahara et al. | |
| 8,643,689 | B2 | | 2/2014 | Ishimi et al. | |
| 8,665,496 | B2 | | 3/2014 | Hasegawa et al. | |

(Continued)

FOREIGN PATENT DOCUMENTS

| JP | 06-045677 | 2/1994 |
| JP | 08-191973 | 7/1996 |

(Continued)

OTHER PUBLICATIONS

European search report dated Aug. 18, 2016 in corresponding European Patent Application No. 16160511.8.

*Primary Examiner* — Stephen Meier
*Assistant Examiner* — John P Zimmermann
(74) *Attorney, Agent, or Firm* — Cooper & Dunham LLP (57) ABSTRACT

To provide a protection barrier, which includes an inlet from which laser light emitted from a laser device enters; an outlet from which the laser light is output towards an irradiation target; and a unit configured to prevent a leakage, where the unit is configured to reduce an intensity of the laser light leaked from the protection barrier, wherein the protection barrier is configured to surround a light path of the laser light emitted from the laser device.

7 Claims, 8 Drawing Sheets

(56) References Cited

U.S. PATENT DOCUMENTS

| | | | |
|---|---|---|---|
| 8,933,981 B2 | 1/2015 | Yamamoto et al. | |
| 9,073,359 B2* | 7/2015 | Nakajima | B41J 3/543 |
| 9,090,105 B2 | 7/2015 | Ishikake et al. | |
| 2006/0000814 A1* | 1/2006 | Gu | B23K 26/0084 219/121.69 |
| 2006/0290760 A1* | 12/2006 | German | G03G 15/2007 347/102 |
| 2007/0285488 A1 | 12/2007 | Ishimi et al. | |
| 2009/0115827 A1* | 5/2009 | Endo | B41J 11/0015 347/102 |
| 2010/0271449 A1* | 10/2010 | Kusunoki | B41J 11/002 347/102 |
| 2012/0075402 A1 | 3/2012 | Ishimi et al. | |
| 2012/0181454 A1 | 7/2012 | Kubota | |
| 2012/0211673 A1 | 8/2012 | Yamamoto | |
| 2013/0135425 A1 | 5/2013 | Yamamoto | |
| 2013/0141512 A1 | 6/2013 | Asai et al. | |
| 2014/0078234 A1 | 3/2014 | Kawahara et al. | |
| 2014/0099574 A1 | 4/2014 | Kawahara et al. | |
| 2014/0158771 A1 | 6/2014 | Ohi et al. | |
| 2014/0231398 A1 | 8/2014 | Land et al. | |
| 2014/0285606 A1 | 9/2014 | Ishimi et al. | |
| 2014/0353293 A1 | 12/2014 | Huonker | |
| 2015/0080214 A1 | 3/2015 | Yamamoto et al. | |
| 2015/0151550 A1 | 6/2015 | Asai et al. | |

FOREIGN PATENT DOCUMENTS

| | | |
|---|---|---|
| JP | 2003-245790 | 9/2003 |
| JP | 4189524 | 9/2008 |
| JP | 2009-183959 | 8/2009 |
| JP | 2013-060022 | 4/2013 |

* cited by examiner

|   | Container sensor 216 | Container sensor 217 | Laser shutter 212 |
|---|---|---|---|
| 1 | OFF | OFF | CLOSE |
| 2 | ON | OFF | CLOSE |
| 3 | ON | ON | OPEN |
| 4 | OFF | ON | CLOSE |

PROTECTION BARRIER AND LASER IRRADIATION SYSTEM

CROSS-REFERENCE TO RELATED APPLICATIONS

The present application claims priority under 35 U.S.C. §119 to Japanese Patent Application No. 2015-051967, filed Mar. 16, 2015. The contents of which are incorporated herein by reference in their entirety.

BACKGROUND OF THE INVENTION

Field of the Invention

The present invention relates to protection barriers and laser irradiation systems.

Description of the Related Art

In a distribution conveyor system, conventionally, an object to be transported (a baggage or a container) can be identified by attaching, by means of an auto labeler, an adhesive label, to which necessary information, such as shipping address, and barcode, is printed, to the object transported by a conveyor.

Recently, a reversible thermosensitive recording medium, which colors and erases with heat, has been applied as a label for a transporting container for a distribution conveyor system, in view of energy saving, and protection of the environment. Systems for printing an object to be transported (irradiation target) in a non-contact manner using a laser device have been proposed (see, for example, Japanese Unexamined Patent Application Publication No. 2009-183959).

Laser light used for label printing in such a system is extremely strong, and may burn or damage eye sight, if the laser light is directly applied to skin or eyes of humans. Accordingly, a protection barrier is installed in a working environment where people may come close to a laser device during printing, in order to adjust the laser exposure to human bodies to a safe level.

Conventional protection barriers cover objects to be transported on a conveyor, and the entire conveyor, and are in a large scale. There are however problems that an installation space is not sufficiently secured when a laser device replaces the existing auto labeler of the conveyor system, and the number of installation steps is large. As a size of an object to be transported, and a width of a conveyor for use are different depending on a user, moreover, a conventional protection barrier has a problem that it is necessary to design each protection barrier for each particular purpose, and the protection barrier lacks in versatility. Accordingly, a protection barrier that is small in the size, and highly versatile has been considered for use.

However, laser light may be leaked from the small protection barrier, as it is difficult to cover objects to be transported and an entire conveyor with the small protection barrier.

SUMMARY OF THE INVENTION

The present invention aims to provide a protection barrier capable of reducing a leakage of laser light.

As the means for solving the aforementioned problems, the protection barrier of the present invention includes an inlet from which laser light emitted from a laser device enters, an outlet from which the laser light is output towards an irradiation target, and a unit configured to prevent a leakage, where the unit is configured to reduce an intensity of the laser light leaked from the protection barrier, wherein the protection barrier is configured to surround a light path of the laser light emitted from the laser device.

The present invention can provide a protection barrier capable of reducing a leakage of laser light.

DETAILED DESCRIPTION OF THE INVENTION

Embodiments for carrying out the present invention are described with reference to the drawings, hereinafter. In each drawing, an identical reference is given to an identical constitutional component, and a description may be omitted when overlapped.

The term "irradiation target" means an object to which laser light is applied. Examples of the irradiation target include a plastic container, a cardboard box, a paper box, a wooden box, and a metal pallet.

The term "recording medium" means a medium that can absorb laser to form an image, and means a sheet to which a rewritable material is applied, or an area of an irradiation target, to which a rewritable material is applied. In the case where a material constituting an irradiation target itself can absorb light to form an image, moreover, the irradiation target can be regarded as a recording medium.

First Embodiment

Entire Structure of Laser Irradiation System

Figure 1:
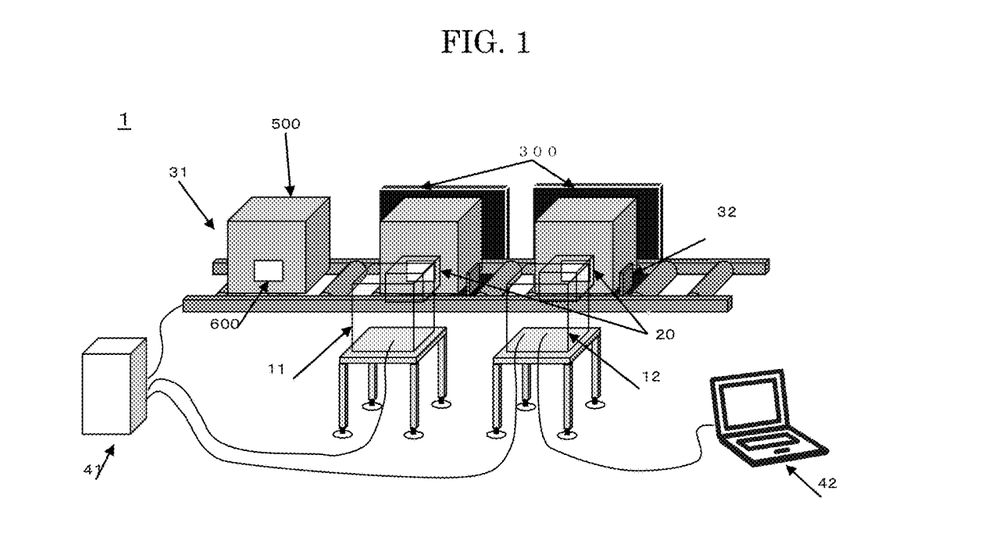
FIG. 1 is a perspective view illustrating one example of the laser irradiation system according to the first embodiment.

FIG. 1 is a perspective view illustrating the laser irradiation system according to the first embodiment. Referring to FIG. 1, the laser irradiation system 1 includes a laser device 10 (an eraser 11 and a marker 12), a protection barrier 20, a transporting device (not illustrated), a controlling device (not illustrated), and a laser termination plate 300.

The laser device 10 contains the eraser 11, and the marker 12. The protection barrier 20 contains a protection barrier 21, and a protection barrier 22 (see FIG. 2A and FIG. 2B). Note that, the protection barriers 21 and 22 may have identical structures, although the different references are used for convenience. The transporting device contains a conveyor 31, and a stopper 32. The controlling device (not illustrated) contains a conveyor controlling device 41, and a host computer 42. The laser termination plate 300 is configured to stop the progression of the laser light. A size of the laser termination plate 300 is determined with a swinging angle of laser of the laser device 10, and a distance with the laser device. Use of the laser termination plate 300 can enhance safety when laser is emitted from the laser device 10 by mistake without an irradiation target being there. Note that, in FIG. 1, the eraser 11 and the marker 12 are drawn transparently for convenience.

In the laser irradiation system 1, the conveyor 31 (roller conveyor) is controlled by the conveyor controlling device 41. The control sections of the conveyor 31 are separated with the upstream of the eraser 11 (upstream of the conveying direction), in front of the eraser 11 (in front of the emitting direction), in front of the marker 12 (in front of the emitting direction), and downstream of the marker 12 (downstream of the conveying direction).

For example, the conveyor controlling device 41 judges a presence of the container 500, which is an irradiation target (control target) by a sensor, to control the conveyor 31 to move or stop in each section. Use of the conveyor controlling device 41 can convey the container 500 without bumping into the container 500 in front of the line, or can stop the container 500 in from of the eraser 11 or the marker 12.

In order to accurately stop the container 500 in front of the eraser 11 or the marker 12, a stopper 32 movable in up-down directions is preferably disposed on the conveyor 31. The stopper 32 is controlled by the conveyor controlling device 41 to move the stopper 32 down when the conveyor 31 is operated, and to move the stopper 32 up at the appropriate timing, when the conveyor 31 is stopped.

As the bottom side of the front surface of the conveyor 31 is pressed against the stopper 32 when the conveyor 31 is stopped, hence, the container 500 can be accurately stopped in front of the eraser 11 or the marker 12. In the case where a belt conveyor using a servometer capable of accurately controlling a traveling distance of the container 500 is used, however, the stopper 32 may not be disposed.

A rewritable label 600, which is a recording medium, is attached to a side surface of the container 500. The rewritable label 600 is a label, on which a visual image can be repeatedly printed or erased with heat generated when laser light is absorbed. The content or delivery destination of the container 500 can be printed on the rewritable label 600. For example, the rewritable label 600 is a reversible thermosensitive recording medium.

The laser device 10 is arranged with the predetermined positional relationship with the conveyor 31, and can perform printing or erasing on the rewritable label 600 in a non-contact manner. Specifically, the eraser 11 is configured to emit laser light to the rewritable label 600 to thereby erase printed characters thereon. The marker 12 is configured to emit laser light to the rewritable label 600 to thereby print characters thereon.

The eraser 11 or marker 12 is connected to the conveyor controlling device 41. The conveyor controlling device 41 can control in the manner that an erasing onset signal is output when the container 500 is stopped in front of the eraser 11, and a printing onset signal is output when the container 500 is stopped in front of the marker 12. Erasing or printing may be performed with transporting the container 500, depending on the transportation accuracy of the conveyor 31, or a type of an image or characters to be printed.

The marker 12 is also connected to the host computer 42. The host computer 42 can sequentially send data necessary for printing to the marker 12, while monitoring whether printing performed by the marker 12 is finished.

Moreover, the laser device for use in the present invention is not limited to a laser device, which realizes a coloring state and erased state of the aforementioned rewritable label repeatedly. The protection barrier can be also used as a laser protection barrier for a laser device, which colors a label only once. The protection barrier can be also used as a laser protection barrier, which covers a laser processing machine that applies laser light to an irradiation target to perform machining, cutting, curving, or marking.

The protection barrier 21, which is a laser safety cover, is disposed between the eraser 11 and the container 500. The protection barrier 21 is formed in the shape of a duct (a tube) in a manner that the protection barrier 21 surrounds a light path of laser light between the eraser 11 and the container 500. The both ends of the protection barrier 21 are open. The inlet of the protection barrier 21 at the side of the eraser 11 is secured in a state that the inlet is in contact with the eraser 11, and functions as an inlet from which laser light emitted from the eraser 11 enters. The outlet of the protection barrier 21 at the side of the container 500 functions as an outlet from which laser light is released to the rewritable label 600. A gap (e.g., about several millimeters) is formed between the outlet of the eraser 11 and the side surface of the container 500.

The protection barrier 22, which is a laser safety cover, is arranged between the marker 12 and the container 500. The protection barrier 22 is formed in the shape of a duct (a tube) in a manner that the protection barrier 21 surrounds a light path of laser light between the marker 12 and the container 500. The both ends of the protection barrier 22 are open. The inlet of the protection barrier 22 at the side of the marker 12 is secured in a state that the inlet is in contact with the marker 12, and functions as an inlet from which laser light emitted from the marker 12 enters.

The aforementioned state that the inlet is in contact with the marker may be a state where the inlet is adjacent to the marker, provided that leaked light from the inlet is in a small amount, and at a safe level.

The outlet of the protection barrier 22 at the side of the container 500 functions as an outlet from which laser light is released to the rewritable label 600. A gap (e.g., about several millimeters) is formed between the outlet of the marker 12 and the side surface of the container 500.

The length of each of the protection barriers 21 and 22 along the light path direction is preferably set in a manner that each protection barrier does not come in contact with the container 500 when containers 500 are repeatedly transported, and a gap between the end of each protection barrier and the side surface of the container 500 is as small as possible, in order to reduce scattering of laser light.

The size of each of the outlets of the protection barriers 21 and 22 is any size as long as the size thereof is larger than a printing region of the rewritable label 600. The size of each outlet is preferably larger than the entire rewritable label 600, but smaller than the side surface of the container 500 in order to give the protection barriers versatility.

Figure 2A:
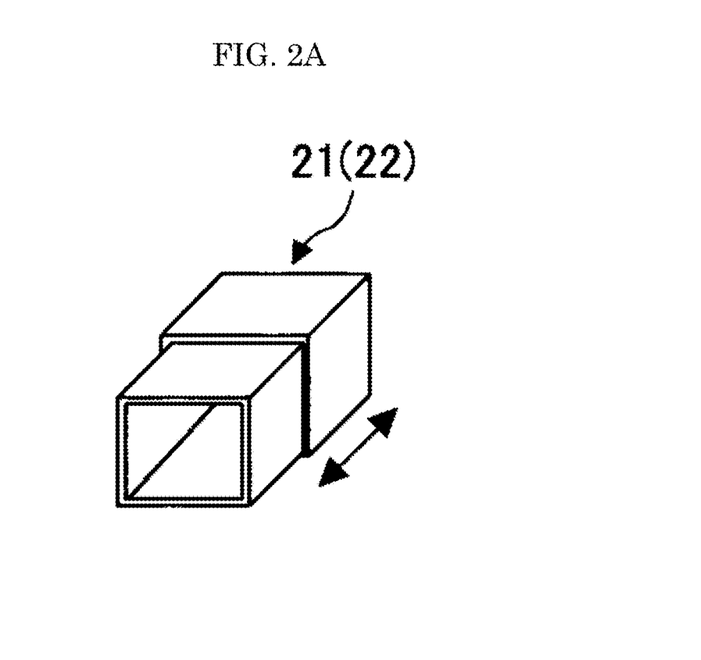
FIG. 2A is a view illustrating one example of a system for adjusting a length of the protection barrier.
Figure 2B:
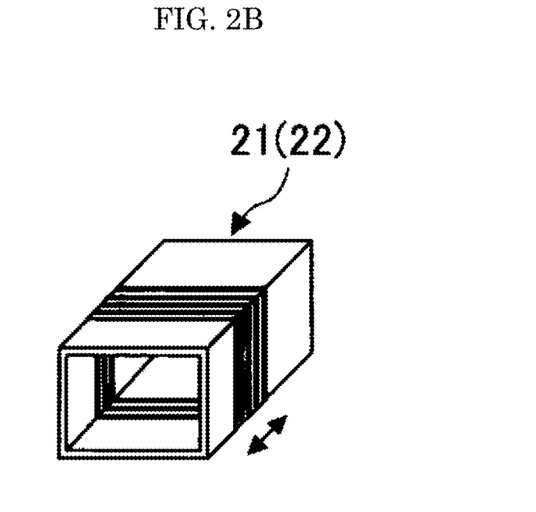
FIG. 2B is a view illustrating another example of a system for adjusting a length of the protection barrier.

The systems for adjusting the length of the protection barriers 21 and 22, as illustrated in FIGS. 2A and 2B, may be disposed to give a versatility in a manner that the protection barriers can be commonly used in a plurality of laser irradiation systems. As one example of the system for adjusting the lengths of the protection barriers 21 and 22, FIG. 2A illustrates an example of a double structure where the protection barriers 21 and 22 are slidable in the output direction of the laser light. As another example of the system for adjusting the lengths of the protection barriers 21 and 22, FIG. 2B illustrates an example of a bellows structure where at least part of the protection barriers 21 and 22 is stretchable in the output direction of laser light.

As mentioned above, the protection barriers 21 and 22 each have a structure that surrounds the light path of laser light between the container 500 and the laser device 10. Therefore, the protection barrier can be significantly made small compared to a conventional protection barrier having a structure that covers irradiation targets transported on a conveyor, and the entire conveyor. Specifically, the volume of the protection barrier can be reduced to $1/100$ or smaller compared to a size of a conventional protection barrier. Accordingly, the installation space of the protection barrier can be reduced. As the protection barrier is small and easily handled, moreover, the number of installation steps of the protection barrier can be reduced.

Moreover, the basic laser light emission conditions are determined with the specification of the laser device 10, and are not influenced by the width or height of the conveyor 31, and the width or height of the container 500. Accordingly, the protection barriers 21 and 22 can be commonly used in any systems using containers and conveyors of different sizes, as long as the system uses a laser device 10, hence versatility and mass productivity of the protection barrier can be improved.

[Unit Configured to Prevent Leakage of Laser Light]

The protection barriers 21 and 22 are each a structure surrounding only a light path of laser light between the container 500 and the laser device 10. Accordingly, a gap is required between surfaces of the protection barriers 21 and 22, and a surface of the container 500 facing each other, in order to prevent the protection barriers 21 and 22 from being in contact with the container 500 transported on the conveyor 31. There is a possibility that reflection light or scattering light may be leaked from the gap.

Typically, the leakage of light can be suppressed by making the gap small. However, it is necessary to secure a certain degree of the gap in view of a transportation positioning accuracy of the container 500. Accordingly, it is preferred that a unit configured to prevent a leakage of laser light be disposed to the protection barrier 21 in order to reduce light intensity of laser light leaked from the gap between the outlet of the eraser 11, and a side surface of the container 500. Similarly, it is preferred that a unit configured to prevent a leakage of laser light be disposed to the protection barrier 22 in order to reduce light intensity of laser light leaked from the gap between the outlet of the marker 12 and a side surface of the container 500. The light intensity of laser light leaked from the protection barriers 21 and 22 is, for example, Class 1 or less determined by IEC60825-1, and JIS C 6802. Specifically, the light intensity is preferably 1,390 µW or less, when the wavelength of laser light is 980 nm.

The light intensity of the leaked light is measured by determining reflection light (e.g., primary reflection light and secondary reflection light of laser emitted from the laser device) released from the opening of the protection barrier as leaked light, applying the leaked light on a receiving surface of a power sensor of, for example, a laser power reader (product name: Vega, manufactured by Ophir Optronics Solutions Ltd.), and reading displayed information on a display connected to the power sensor. The measurement is performed on a plurality of points by changing the position within the distance range of about 10 cm from the gap between the outlet of the protection barrier and the irradiation target. Erasing or printing is performed with the receiving surface of the power sensor facing to the direction of the gap, and the maximum value displayed on the display is read. This process is repeated.

As one example of the unit configured to prevent a leakage of the protection barriers 21 and 22, a blackening treatment, which is performed on inner surfaces of the protection barriers 21 and 22, and the treated inner surfaces absorb laser light to thereby reduce reflectance. Specifically, the inner surface of the protection barrier 21 preferably has a structure that reduces the reflectance of laser light to about a one-digit value with respect to the laser light wavelength of the eraser 11, in order to reduce the light intensity of the leaked laser light. Similarly, the inner surface of the protection barrier 22 preferably has a structure that reduces the reflectance of laser light to about a one-digit value with respect to the laser light wavelength of the marker 12, in order to reduce the light intensity of the leaked laser light.

Figure 3:
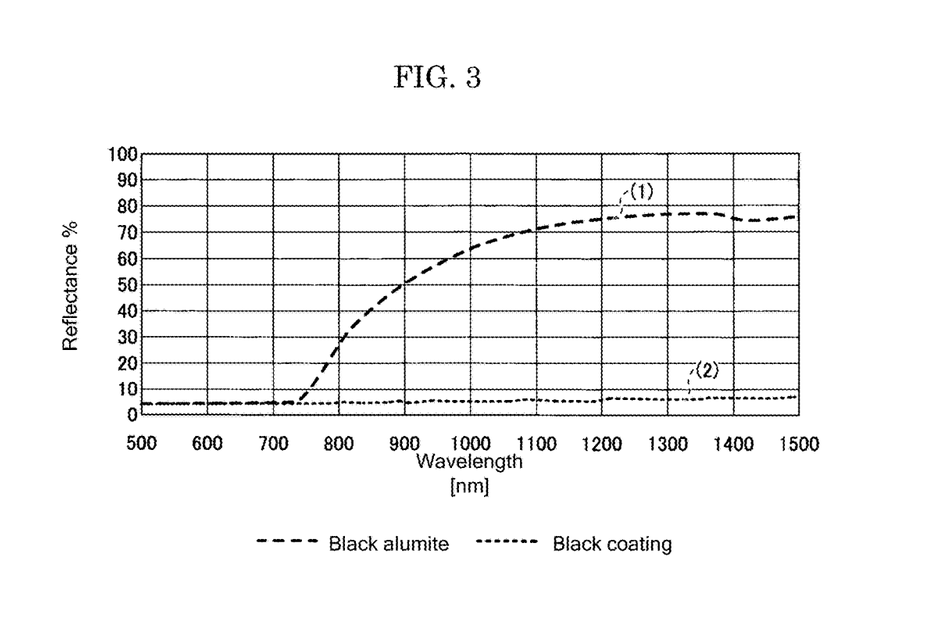
FIG. 3 is a view for describing one example of a method for reducing reflectance of laser light.

In the case where laser light emitted from the eraser 11 and the marker 12 is near infrared-rays having wavelengths of about 980 nm, for example, the reflectance is reduced only to about 60% even when a black alumite treatment is performed on inner surfaces of the protection barriers, as illustrated in (1) of FIG. 3. As the unit configured to prevent a leakage of the protection barriers 21 and 22, therefore, matte black coating mainly composed of carbon performed on the inner surfaces is inexpensive, and effective. In this case, the inner surfaces of the protection barriers 21 and 22 absorb laser light, and therefore, reflectance of laser light can be reduced to about 5% or less, as depicted as (2) of FIG. 3.

In the case where wavelengths of laser light emitted from the eraser 11 and the marker 12 are 750 nm or shorter, a black alumite treatment may be performed, or matte black coating mainly composed of carbon may be performed.

The example of the blackening treatment has been described above, but other treatments than the blackening treatment may be performed inner surfaces of the protection barriers 21 and 22 may be performed as the unit configured to prevent a leakage. Examples of the treatment other than the blackening treatment include a treatment, in which metal oxide particles [e.g., antimony tin oxide (ATO), indium tin oxide (ITO), lanthanum boride, and tungsten oxide] are dispersed and applied (dispersion coating). In this case, the treatment can be visually recognized as blue or green after the dispersion coating.

The reflectance is determined as a measuring value as measured by an integrating-sphere visible and near-infrared spectrometer, when the reflectance of a $BaSO_4$ white board is determined as 100%. The reflectance was measured by means of an integrating sphere spectrophotometer (U-4100, manufactured by Hitachi High-Tech Science Corporation).

[Laser Shutter]

If laser light is accidentally emitted when a container 500 is not present in front of the protection barriers 21 and 22, laser light of high intensity is radiated, which is dangerous. In order to prevent accidental emission of laser light from the laser device 10, therefore, a laser shutter is preferably disposed inside each of the protection barriers 21 and 22.

Figure 4:
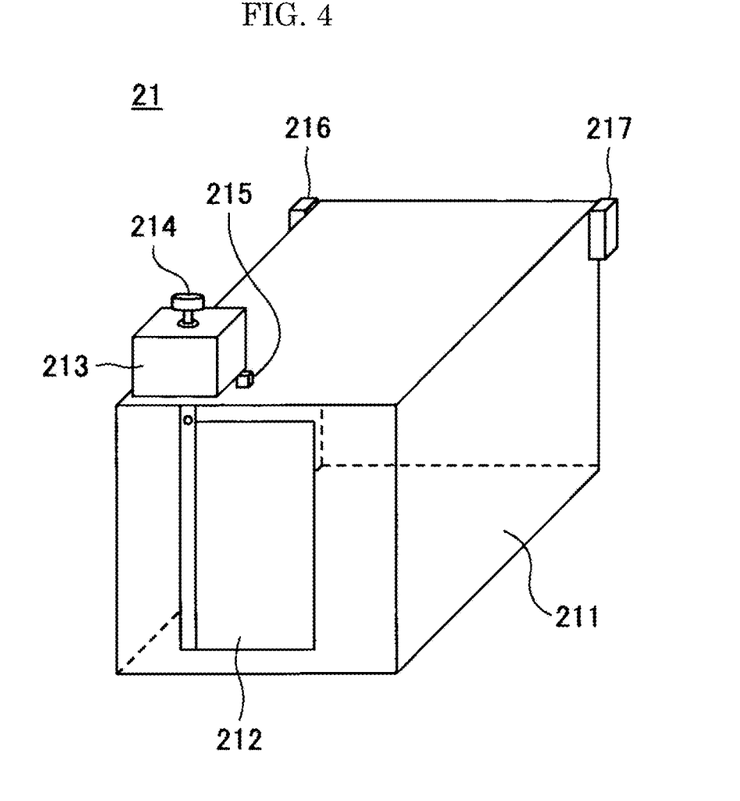
FIG. 4 is a view for describing one example of a laser shutter.

FIG. 4 is a view for illustrating the laser shutter. The laser shutter 212 is a light-shielding plate configured to open and close the inlet of the main body 211 of the protection barrier 21. The laser shutter 212 preferably has a property such that the laser shutter can shield light even after irradiated with laser of the laser device 10 for about 8 hours. In order to increase the opening-closing speed, the laser shutter 212 is preferably formed of light metal, such as aluminium.

The laser shutter 212 is secured, for example, to an axis of a stepping motor 213, which is the driving unit, and can be open and closed by rotations of the stepping motor 213. A dial 214 is preferably disposed at the opposite end of the axis of the stepping motor 213 to the end where the laser shutter 212 is arranged, in order to manually open and close the laser shutter 212.

There is a case where it is desired to release laser light without the container 500, such as a case where an output of laser light released from the outlet of the main body 211 is measured. In this case, the power source of the driving circuit of the stepping motor 213 is turned off, and the laser shutter 212 is manually open or closed by turning the dial 214.

A shutter home sensor 215 configured to detect a closing position of the laser shutter 212 is disposed at the inlet side of the main body 211. Container sensors 216 and 217, which are each a detecting unit for detecting a position of the container 500 (presence of the container 500 in front of the protection barrier 21), are disposed at the outlet side of the main body 211.

Since the container 500 is transported in horizontal direction, for example, the container sensors 216 and 217 are preferably disposed at two positions, which are the right edge and left edge of the outlet side of the main body 211. For example, the container sensors 216 and 217 can detect the presence of the container 500 through optical detection of shield light by the container 500, or reflection light from the container 500.

In the case where light shielding is detected, light emitted from a light emission unit is always received with a receiving part, and reduction in the amount of light received is detected by the receiving part when the container 500 is present. In the case where reflection light is detected, it is designed that the receiving part cannot normally receive light emitted from the light emission part, and an increase in the amount of light emitted from the light emission unit is detected as reflection light from the container 500 when the container 500 is present.

The laser shutter 212 is rotated by the stepping motor 213 to a position where the laser shutter 212 shields laser light in the closed state, when the container 500 is not present in from of the outlet of the main body 211. When the container sensors 216 and 217 detect the presence of the container 500 in front of the outlet of the main body 211, the stepping motor 213 is rotated to open the laser shutter 212.

Figure 5:
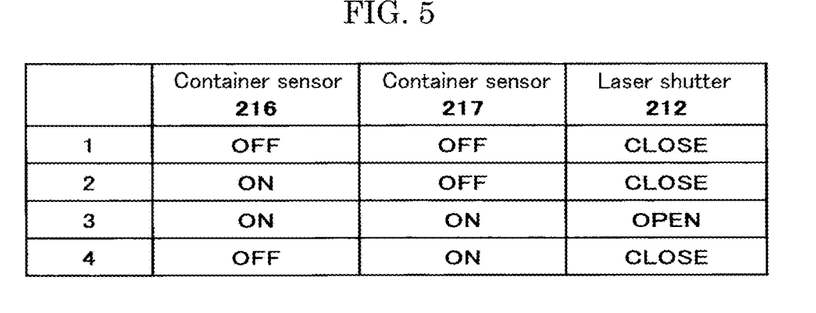
FIG. 5 is a view illustrating one example a relationship between ON/OFF of a container sensor, and an opening-closing of the laser shutter.

FIG. 5 depicts an example of a relationship between ON/OFF of the container sensors and opening and closing of the laser shutter. As depicted in 1 of FIG. 5, the laser shutter 212 is closed when both the container sensors 216 and 217 are OFF.

When the container 500 is transported from the left in FIG. 1, the container sensor 216 is turned ON at first, but the laser shutter 212 remains closed, as the container sensor 217 is OFF, as depicted in 2 of FIG. 5. When the container 500 is further transported, and the container sensors 216 and 217 are both turned ON, the laser shutter 212 is open, as depicted in 3 of FIG. 5.

When the container 500 is stopped at the predetermined position, laser light is emitted from the laser device 10 towards the container 500, to thereby perform erasing or printing. Then, the container 500 is again transported. As depicted in 4 of FIG. 5, the laser shutter 212 is closed when the container sensor 216 is turned OFF, and the laser shutter 212 remains closed even when the container sensor 217 is turned OFF.

Note that, the laser shutter is described together with the protection barrier 21, but a similar laser shutter can be also disposed to the protection barrier 22.

[Structural Example and Basic Action of Marker]

Figure 6:
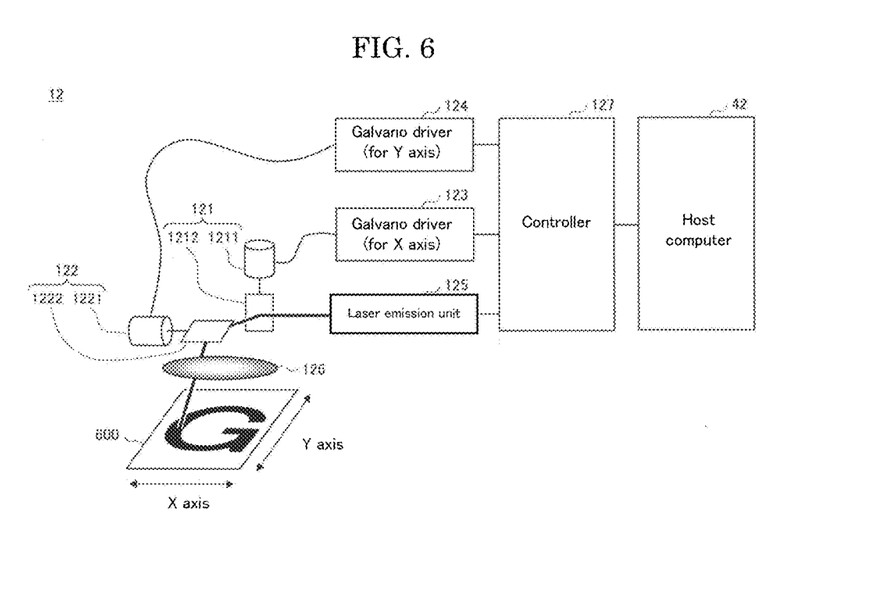
FIG. 6 is a view illustrating one example of a structure of a marker.

FIG. 6 is a view illustrating an example of the structure of the marker. With reference to FIG. 6, the marker 12 includes, for example, galvanometer mirrors 121 and 122, galvano drivers 123 and 124, a laser emission unit 125, an fθ lens 126, and a controller 127.

The galvanometer mirror 121 is a galvanometer 1211 equipped with a mirror 1212 for reflecting laser light, and is a galvanometer mirror for an X axis, which is configured to deflection scan laser light in the X-axis direction. The galvanometer mirror 122 is a galvanometer 1221 equipped with a mirror 1222 for reflecting laser light, is a galvanometer mirror for a Y axis, which is configured to deflection scan laser light in the Y-axis direction. Laser light can be two-dimensionally deflection scanned by the galvanometer mirrors 121 and 122.

The galvano driver 123 is a driving circuit for an X axis, which is configured to control an angle of the galvanometer mirror 121 according to the indicated value from the controller 127. The galvano driver 123 compares an angle sensor signal of the galvanometer mirror 121 with the indicated value from the controller 127, and transmits a driving signal to the galvanometer mirror 121 to minimize the difference with the angle sensor signal and the indicated value.

The galvano driver 124 is a driving circuit for a Y axis, which is configured to control an angle of the galvanometer mirror 122 according to the indicated value from the controller 127. The galvano driver 124 compare an angle sensor signal of the galvanometer mirror 122 with the indicated value from the controller 127, and transmits a driving signal to the galvanometer mirror 122 to minimize the difference with the angle sensor signal and the indicated value.

The laser emission unit 125 is a unit from which laser light is emitted, and is an energy source for visually change a rewritable label 600, which is an irradiation target. The laser emission unit 125 is equipped with a laser, and a power controlling circuit. A type of the laser for use, such as a carbon dioxide laser, a YAG laser, a semiconductor laser, is not limited. For example, a semiconductor laser, a power of which is relatively easily controlled, can be used.

The fθ lens 126 is configured to focus laser light deflected by the galvanometer mirrors 121 and 122 onto a surface of the rewritable label 600, which is a flat surface, as well as performing a correction, in a manner that the angular displacements of the galvanometer mirrors 121 and 122 are proportional to the displacement of the distance of the focused spot.

The controller 127 is configured to receive printing information from the host computer 42 to create drawing data for forming a printing item with lines. The controller 127 can, moreover, form an image on the rewritable label 600 by controlling the positions of the galvanometer mirrors 121 and 122, the emission timing of laser light, and the power of the emission. For example, the printing line width on the rewritable label 600 can be about 0.25 mm. Not only characters, but also a barcode can be printed on the rewritable label 600.

[Structural Example and Basic Action of Eraser]

Figure 7:
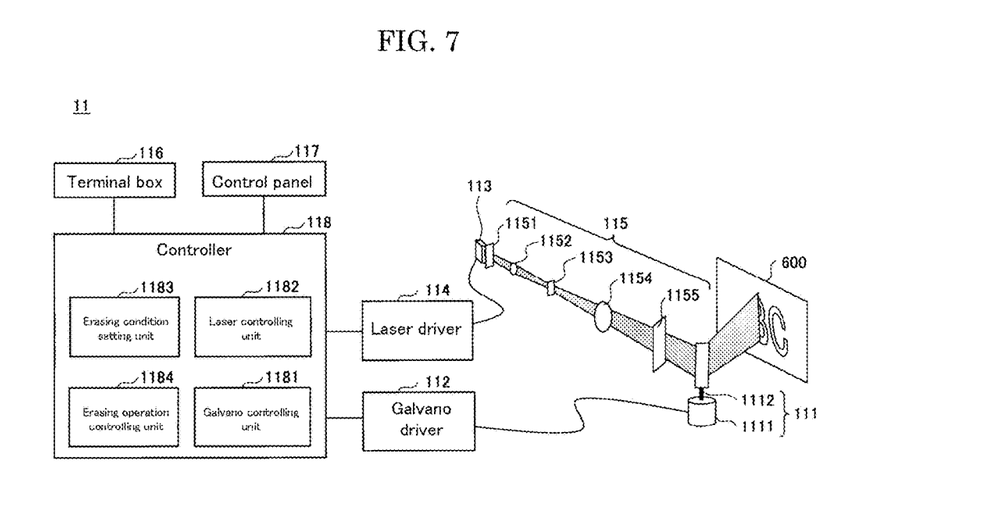
FIG. 7 is a view illustrating one example of a structure of an eraser.

FIG. 7 is a view illustrating an example of the structure of the eraser. With reference to FIG. 7, the eraser 11 includes, for example, a galvanometer mirror 111, a galvano driver 112, a laser diode array 113, a laser driver 114, a plurality of lenses 115, a terminal block 116, a control panel 117, and a controller 118.

The galvanometer mirror 111 is a galvanometer 1111 equipped with a mirror 1112 for reflecting laser light, and is configured to deflection scan laser light.

The galvano driver 112 is a driving circuit configured to control an angle of the galvanometer mirror 111 according to the indicated value from the galvano controlling unit 1181 of the controller 118. The galvano driver 112 compares an angle sensor signal of the galvanometer mirror 111 with the indicated value from the galvano controlling unit 1181 of the controller 118, and transmits a driving signal to the galvanometer mirror 111 to minimize the difference with the angle sensor signal and the indicated value. The galvano controlling unit 1181 is capable of generating and outputting an analog signal for moving the galvanometer mirror 111 from the scanning starting position to the scanning end position instructed by the erasing operation controlling unit 1184 at the designated speed.

The laser diode array 113 is a module having a plurality of laser light sources. For example, the laser diode array 113 is equipped with about 10 to about 20 laser light sources. The length of a plurality of the light sources is about 10 mm. The laser driver 114 is a circuit for generating driving current of the laser diode array 113, and is capable of controlling a laser power of the laser diode array 113 according to the instructed value from the laser controlling unit 1182 of the controller 118.

The laser controlling unit 1182 converts the laser output value instructed by the erasing operation controlling unit 1184 into the analog voltage, and output the analog voltage to the laser driver 114. Moreover, the laser controlling unit 1182 can generate a timing signal for turning on or turning off the laser diode array 113.

Laser light emitted from the laser diode array 113 is expanded by a plurality of lenses 115, as well as homogenizing the energy density of laser light, to thereby form, for example, a linear beam having a length of 60 mm, and a width of 0.5 mm is formed on a surface of the rewritable label 600. Note that, the power of laser light emitted from the eraser 11 is larger than the power of laser light emitted from the marker 12.

For example, the aforementioned lenses 115 have a structure where a cylindrical lens 1151, spherical lens 1152, a microlens array 1153, a spherical lens 1154, and a cylindrical lens 1155 are arranged in this order from the side of the laser diode array 113.

To the terminal block 116, terminals of input signals (e.g., an erasing onset signal, an interlock signal, an environmental temperature signal, and an encoder signal), and terminals of output signals (e.g., an erasing-preparation completion signal, an erasing signal, and an abnormality occurrence signal) are disposed.

The erasing onset signal is a signal for making the eraser 11 start an erasing operation. The interlock signal is a signal for emergency stopping the erasing operation. The environmental temperature signal is a signal for collecting the laser power according to the environmental temperature. The encoder signal is a signal for detecting the traveling speed of the irradiation target. The erasing-preparation completion signal is a signal for indicating that it is ready for receiving the erasing onset signal.

Furthermore, the erasing signal is a signal for indicating that erasing is in progress. The abnormality occurrence signal is a signal for indicating that the controller 118 has detected abnormalities, such as an abnormality of the laser diode array 113, and an abnormality of the galvanometer mirror 111.

For example, the control panel 117 can be composed in a manner that a menu is selected or numbers can be input from a user interface having a display and switches. The erasing condition setting unit 1183 of the controller 118 controls the control panel 117, and can set erasing conditions (e.g., a scanning length of laser light, a scanning speed of laser light, a scanning direction of laser light, an output power of laser light, a delay of erasing start, and a speed of an irradiation target) designated by the user on the eraser 11.

The erasing operation controlling unit 1184 of the controller 118 processes the input signal of the terminal block 116 to instruct the galvano controlling unit 1181 or the laser controlling unit 1182, as well as generating an output signal of the terminal block 116.

[Coloring and Erasing of Rewritable Label]

In the rewritable label 600, for example, low-molecular organic materials before melting are a leuco dye and a reversible color developer (may be referred to as a "color developer" hereinafter), and the low-molecular organic materials after melting but before crystallizing are the leuco dye and the color developer. The color tone of the rewritable label 600 reversibly changes between a transparent state and a colored state upon application of heat.

Figure 8:
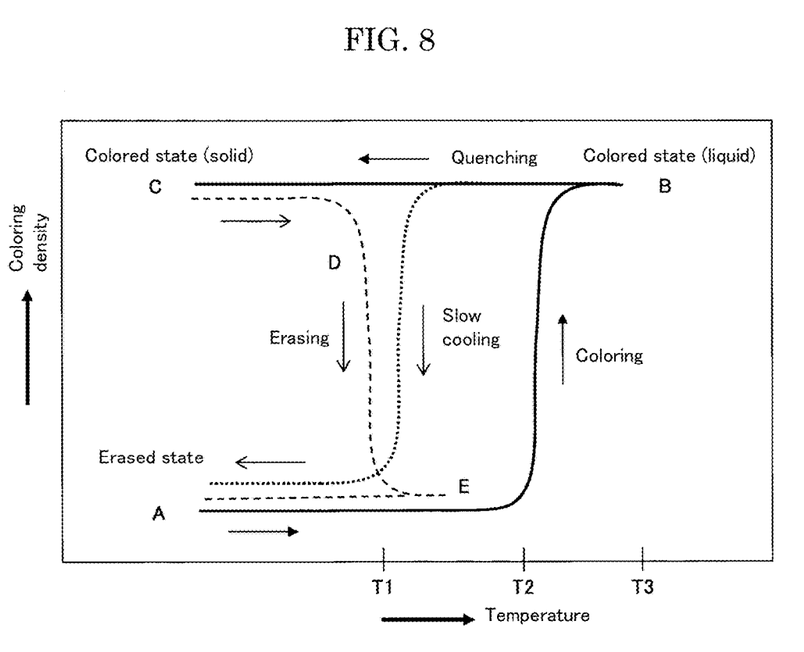
FIG. 8 is a diagram demonstrating a colored state and erased state of a rewritable label.

FIG. 8 is a diagram for describing a colored state and erased state of the rewritable label. With reference to FIG. 8, first, a recording layer in the erased state (A) is heated, and the leuco dye and the color developer are melted and mixed at the melting temperature T2 to color. As a result, the recording layer is turned into the colored state (B). The colored state (B) is a liquid.

As the recording layer in the colored state (B) is quenched, the recording layer can be cooled to room temperature with remaining the colored state, and the recording layer is turned into the colored state (C), in which the colored state is stabilized, and solidified. Whether the colored state (C) is formed depends on a cooling speed from the melted state. When the recording layer in the melted state is slowly cooled, the color is erased in the process of cooling, and the recording layer is turned back to the erased state (A) identical to the initial state, or a state where the color density is relatively low compared to the colored state (C) achieved by quenching.

As the recording layer in the colored state (C) is again heated, the color is erased at the temperature T1 lower than the coloring temperature (from D to E). As the recording layer in this state is cooled, the recording layer is turned into the erased state (A) identical to the initial state.

The colored state (C) attained by quenching from the melted state is a state where the leuco dye and the color developer are mixed to a degree that molecules thereof can carry out a catalytic reaction, and often forms a solid state. In this state, it is assumed that the melted mixture (colored mixture) of the leuco dye and the color developer are crystallized to retain the color, and the formation of this structure stabilizes the color.

In the erased state, on the other hand, the leuco dye and the color developer are present in a state of a phase separation. In this state, it is assumed that molecules of at least one of the compounds are aggregated to form a domain, or crystallized, and the leuco dye and the color developer are separated and stabilized as a result of the aggregation or crystallization. In many cases, more complete erasing is achieved, when the leuco dye and the color developer form a phase separation, and the color developer is crystallized.

Note that, the recording layer may cause an erasing failure, even when the recording layer is heated to the erasing temperature, if the recording layer is repeatedly heated to the temperature T3 that is equal to or higher than the melting temperature T2. It is assumed that this is because the color developer is thermally decomposed, and the color developer is not easily aggregated or crystallized, and it is difficult to separate the color developer from the leuco dye. When the rewritable label 600 is heated, a deterioration of the rewritable label 600 due to repeated recording and erasing can be suppressed by reducing a difference between the melting temperature T2 and the temperature T3.

Second Embodiment

The second embodiment is an example where a unit configured to prevent a leakage of laser light, which is different from the unit of the first embodiment, is disposed. Note that, in the second embodiment, descriptions of the identical components or constitutional units to the first embodiment may be omitted.

Figure 9A:
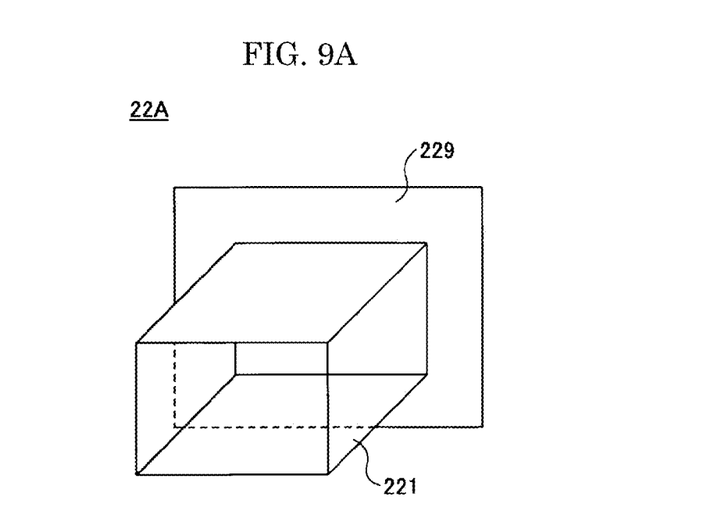
FIG. 9A is a view (part 1) for illustrating a laser-reflection absorbing plate in the form of a flange.
Figure 9B:
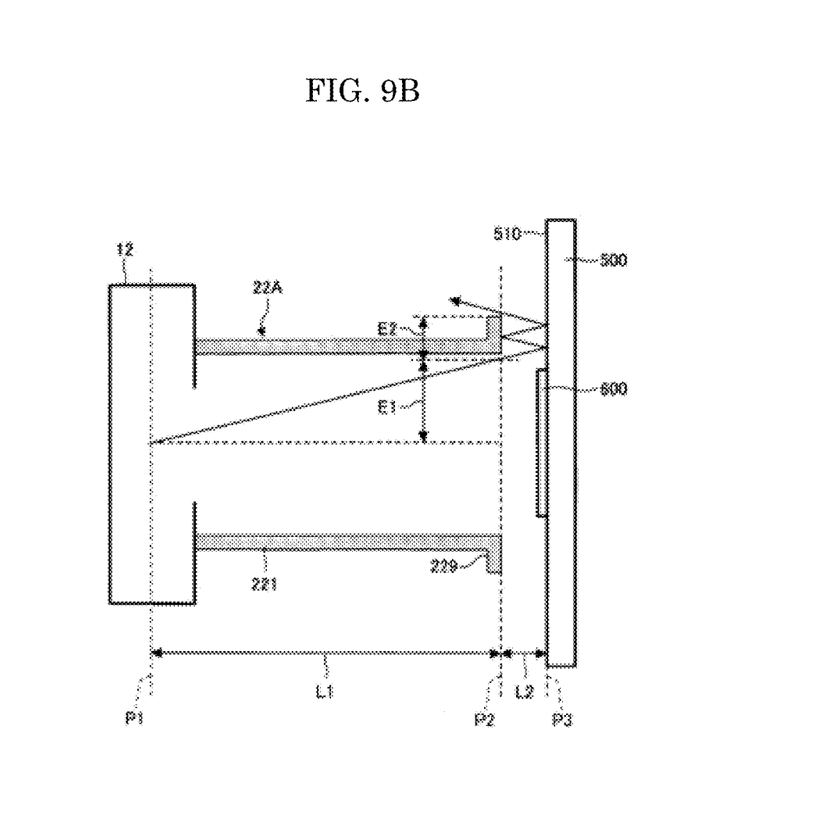
FIG. 9B is a view (part 1) for illustrating a laser-reflection absorbing plate in the form of a flange.

FIGS. 9A and 9B are views for describing a laser-reflection absorbing plate in the form of a flange. As illustrated in FIG. 9A, a laser-reflection absorbing plate 229 in the form of a flange extending the outer side of the outlet of the main body 221 is disposed to the protection barrier 22A.

The laser-reflection absorbing plate 229 is disposed at the position where at least regular reflection light (primary reflection light) reflected by the container 500 is received, and is designed to have a size by which the primary reflection light from the container 500 is not directly released outside. Part of the primary reflection light from the container 500 is bumped into and absorbed by the laser-reflection absorbing plate 229, and the rest is again reflected to the side of the container 500 to become secondary reflection light.

The secondary reflection light from the container 500 can be leaked outside, as long as the reflection absorption properties of the laser-reflection absorbing plate 229 are designed to adjust the secondary reflection light from the container 500 to a safe level. Note that, the safe level is that the light intensity of laser light leaked from the protection barriers 21 and 22 is, for example, Class 1 or below as specified in IEC60825-1 and JIS C 6802.

The larger the laser-reflection absorbing plate 229, the more reduction of the light intensity of leaked light (secondary or greater reflection light can be prevented from being released to outside), as long as an installation space is secured. The effective minimum size of the laser-reflection absorbing plate 229 can be determined by the following calculation. This size is a size with which at least primary reflection light from the container 500 is not directly released to outside.

As illustrated in FIG. 9B, a length from the position P1 of the galvanometer mirror of the marker 12 to the position P2 of the outlet of the edge of the laser-reflection absorbing plate 229 is determined as L1, and a length from the position P2 to the position P3 of the side surface 510 of the container 500 is determined as L2. Moreover, at the interface (position P2) between L1 and L2, a distance between laser light deflected at the maximum angle with which laser light is not incident on the inner surface of the main body 221, and laser light parallel to the main body 221 is determined as E1.

Furthermore, a distance between laser light deflected at the maximum angle with which laser light is not incident on the inner surface of the main body 221, and the outer peripheral edge of the laser-reflection absorbing plate 229 is determined as E2. E2 is represented by the following formula: $E2 \text{ (min)}=2 \times E1 \times L2/L1$. E2 (min) is the minimum size of the laser-reflection absorbing plate, with which regular reflection light from the side surface 510 of the container 500 is incident on the laser-reflection absorbing plate 229 at least once, when laser light is deflected at the maximum angle at which laser light is not incident on the inner surface of the main body 221.

Moreover, a damping effect of laser light can be enhanced by adjusting E2 to an appropriate value larger than E2 (min), and designing the size of the laser-reflection absorbing plate 229 as a size thereof with which regular reflection light from the side surface 510 of the container 500 is incident on the laser-reflection absorbing plate 229 twice, or three times. Note that, the laser-reflection absorbing plate 229 may not be required, if the size of the main body 221 is sufficiently larger relative to the maximum deflection angle of laser light owing to a rotational limitation of galvanometer mirror.

In order to reduce the intensity of laser light leaked from the gap between the protection barrier 22A and the side surface 510 of the container 500, the laser-reflection absorbing plate 229 is preferably arranged approximately parallel to the side surface 510 of the container 500.

Moreover, the surface of the laser-reflection absorbing plate 229 facing the side surface 510 of the container 500 preferably reduces the reflectance to a value of about one digit at the laser wavelength of the marker 12, similarly to the case of FIG. 3. For example, the surface of the laser-reflection absorbing plate 229 facing the side surface 510 of the container 500 is subjected to matte black coating mainly composed of carbon.

As the black coating is performed, laser light emitted from the marker 12 reduces the intensity thereof while repeatedly reflected between the laser-reflection absorbing plate 229 and the side surface 510 of the container 500, and the intensity of laser light becomes a safe level. Furthermore, matte black coating mainly composed of carbon may be performed on the inner surface of the main body 221.

The shape of the laser-reflection absorbing plate 229 is not limited to the shape expanding into every direction of the outlet of the main body 221. The laser-reflection absorbing plate 229 may not be disposed along the direction where the light intensity of leaked laser light is weak. Specifically, the shape of a flange means an embodiment a shape has a projected area extended from the main body 221, but it is not necessarily extending into all the directions relative to the perimeter of the main body 221, provided that the laser-reflection absorbing plate 229 is extended at least one direction relative to the perimeter of the main body 221. In case of the eraser 11, for example, it is effective to dispose a laser-reflection absorbing plate extended into horizontal two directions from the main body 221, as laser light is scanned only in one direction (horizontal direction).

Figure 10A:
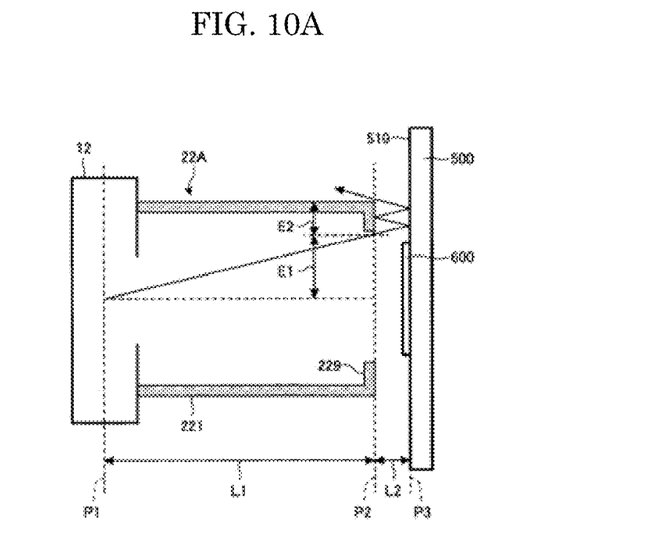
FIG. 10A is a view (part 2) for illustrating a laser-reflection absorbing plate in the form of a flange.

As illustrated in FIG. 10A, a laser-reflection absorbing plate 229 in the form of a flange extended into the inner side of the main body 221 may be disposed. In this case, similarly to the case of FIG. 9B, the same effect can be attained, as regular reflection light from the side surface 510 of the container 500 is incident on the laser-reflection absorbing plate 229 at least once, when laser light is deflected at the maximum angle at which laser light is not incident on the inner surface of the main body 221.

Figure 10B:
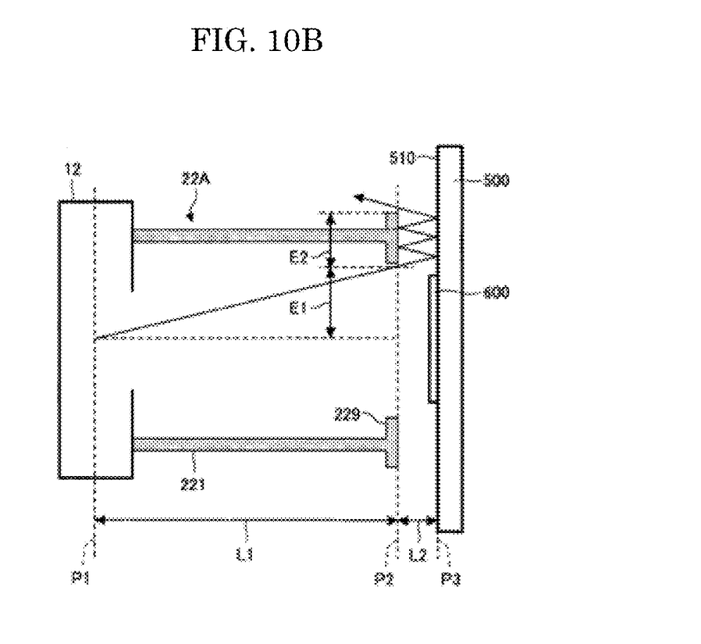
FIG. 10B is a view (part 2) for illustrating a laser-reflection absorbing plate in the form of a flange.

As illustrated in FIG. 10B, moreover, a laser-reflection absorbing plate 229 in the form of a flange extending into the inner side and outer side of the outlet of the main body 221 may be disposed. In this case, a damping effect of laser light can be enhanced, as the light-reflection absorbing plate 229 is designed to have a size with which regular reflection light from the side surface 510 of the container 500 is incident on the laser-reflection absorbing plate 229 twice, or three times.

Since the laser-reflection absorbing plate 229 in the form of a flange is disposed to the protection barrier 22A as described above, at least primary reflection light is prevented from being directly released to outside, and only laser light the intensity of which is sufficiently reduced to a safe level is leaked outside.

The laser-reflection absorbing plate has been described in association with the protection barrier 22A of the marker 12. The same effect can be attained by disposing the similar laser-reflection absorbing plate in the form of a flange to the protection barrier of the eraser 11.

The preferred embodiments are specifically described above, but the present invention is not limited to the embodiments described above. Various modifications and substitutions can be made to the aforementioned embodiments without being departed from the scopes specified by the claims of the present invention.

For example, the rewritable laser irradiation system capable of repeatedly performing printing and erasing has been described in the embodiments above, but the present invention can be also applied for a laser irradiation system that performs printing only once, and a laser irradiation system that performs mechanical machining.

The present invention can be also applied for a laser irradiation system equipped with only either a marker or an eraser as a laser device, and a laser irradiation system, in which a printing operation and an erasing operation are performed only with one laser device.

Third Embodiment

Entire Structure of Laser Irradiation System

Figure 11:
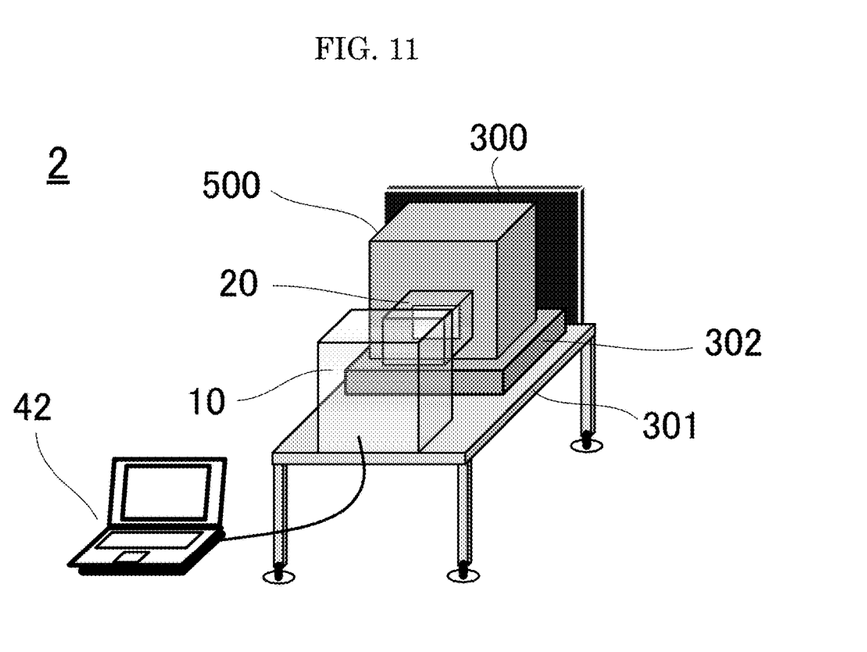
FIG. 11 is a perspective view illustrating one example of the laser irradiation system according to the third embodiment.

FIG. 11 is a perspective view illustrating an example of the laser irradiation system according to the third embodiment. With reference to FIG. 11, the laser irradiation system 2 includes a laser device 10, a protection barrier 20, a host computer 42, a laser termination plate 300, and a stand 301.

Note that, in FIG. 11, the laser device is drawn transparently for convenience.

The laser device 10 includes an eraser and a marker.

A rewritable label (not illustrated), which is a recording medium, is attached to a side surface of the container 500 that is an irradiation target. The rewritable label is a label, on which a visual image can be repeatedly printed or erased with heat generated when laser light is absorbed. The content or delivery destination of the container can be printed on the rewritable label. For example, the rewritable label is a reversibly thermosensitive recording medium.

The laser device 10 is arranged with the predetermined positional relationship with the container 500 as the irradiation target, and can perform printing or erasing on the rewritable label in a non-contact manner. Specifically, the laser device per se can emit laser light to the rewritable label to thereby erase characters printed thereon, and can emit laser light to rewritable label, to thereby print characters.

The container 500 is placed on a slide table 302, which is manually slid. The container 500 is easily replaced without being disturbed by the laser device 10 by performing the replacement in the state where the slide table 302 is pulled out.

A positioning system (not illustrated) by which the container is immobilized is disposed on the slide table 302, and thus the positional relationship between the container and the laser device 10 is easily secured. Although they are not illustrated, the slide table 302 includes a switch for detecting that the table is pushed, and a switch for detecting the presence of the container. When both switches are turned ON, a printing onset signal is transmitted to the laser device.

The laser device 10 is connected to the host computer 42. The host computer 42 can send data necessary for printing, and sequentially transmits data, as the host computer 42 receives a printing completion status.

The protection barrier 20, which is a laser safety cover, is disposed between the laser device 10 and the container 500. The protection barrier 20 is formed in the shape of a duct (a tube) in a manner that the protection barrier 20 surrounds a light path of laser light between the laser device 10 and the container 500. The both ends of the protection barrier 20 are open. The inlet of the protection barrier at the side of the laser device is secured in a state that the inlet is in contact with the laser device, and functions as an inlet from which laser light emitted from the laser device enters. The outlet of the protection barrier at the side of the container 500 functions as an outlet from which laser light is released to the rewritable label. A gap (e.g., about several millimeters) is formed between the outlet of the laser device 10 and the side surface of the container 500.

The length of the protection barrier along the light path direction is preferably set in a manner that the protection barrier does not come in contact with the container 500 when containers 500 are repeatedly replaced, and a gap with the side surface of the container 500 is as small as possible, in order to reduce scattering of laser light.

The size of the outlet of the protection barrier 20 is any size as long as the size thereof is larger than a printing region of the rewritable label. The size of each outlet is preferably larger than the entire rewritable label, but smaller than the side surface of the container 500 in order to give the protection barriers versatility.

As mentioned above, the protection barrier 20 has a structure that surrounds the light path of laser light between the container 500 and the laser device 10. Therefore, the protection barrier can be significantly made small compared to a conventional protection barrier having a structure that covers the entire irradiation target. Specifically, the volume of the protection barrier can be reduced to ¹⁄₁₀₀ or smaller compared to a size of a conventional protection barrier. Accordingly, the installation space of the entire system can be reduced. As the protection barrier is small and easily handled, moreover, the number of installation steps of the protection barrier can be reduced.

Moreover, the basic laser light emission conditions are determined with the specification of the laser device, and are not influenced by the width or height of container 500. Accordingly, the protection barrier 20 can be commonly used in any system using containers and conveyors of different sizes, as long as the system uses the laser device, hence versatility and mass productivity of the protection barrier can be improved.

The laser termination plate 300 is disposed at the back side of the container 500 viewing from the side of the laser device. The laser termination plate 300 is configured to stop the progress of laser light, and enhance safety, when laser light is accidentally emitted from the laser device without the presence of the container 500 as an irradiation target. The container 500 as the irradiation target is easily replaced with retaining the positional relationship with the laser device 10. Once an operator place a new container, the host computer is operated to perform erasing and printing. As the installation space is smaller than that of the conveyor system, an installation thereof is easy when the number of rewriting is small.

For example, the embodiments of the present invention are as follows.

<1> A protection barrier including:
an inlet from which laser light emitted from a laser device enters; an outlet from which the laser light is output towards an irradiation target; and
a unit configured to prevent a leakage, where the unit is configured to reduce an intensity of the laser light leaked from the protection barrier, wherein the protection barrier is configured to surround a light path of the laser light emitted from the laser device.

<2> The protection barrier according to <1>, wherein the protection barrier is arranged in a manner that the inlet is in contact with or adjacent to the laser device, and the outlet forms a gap with the irradiation target which is stopped at a position at which at least one of recording and erasing is performed.

<3> The protection barrier according to <1> or <2>, wherein, as the unit configured to prevent a leakage, a treatment for absorbing the laser light is performed on an inner surface of the protection barrier from the inlet through the outlet.

<4> The protection barrier according to <3>, wherein reflectance of an area to which the treatment has been performed is 10% or less at wavelengths around a wavelength of the laser light of the laser device.

<5> The protection barrier according to <3> or <4>, wherein the treatment is matte black coating including carbon as a main component.

<6> The protection barrier according to any one of <1> to <5>, wherein, as the unit configured to prevent a leakage, a laser-reflection absorbing plate in a form of a flange is disposed at the outlet.

<7> The protection barrier according to <6>, wherein the laser-reflection absorbing plate is disposed at a position where primary reflection light is received, wherein the primary reflection light is light emitted from the outlet and reflected by the irradiation target.

<8> The protection barrier according to <6> or <7>, wherein matte black coating including carbon as a main component is performed on a surface of the laser-reflection absorbing plate facing the irradiation target.

<9> The protection barrier according to any one of <6> to <8>, wherein laser-reflection absorbing plate is in the form of the flange extending an inner side and outer side of the outlet.

<10> The protection barrier according to any one of <1> to <9>, further including:
a light-shielding plate configured to shield the laser light emitted from the laser device;
a driving unit configured to drive the light-shielding plate; and a detecting unit configured to detect a position of the irradiation target, wherein the driving unit opens the light-shielding plate, in a case where the detecting unit detects that the irradiation target is present in front of the outlet.

<11> The protection barrier according to any one of <1> to <10>, wherein the outlet is larger than a region of the irradiation target in which at least one of recording and erasing is performed, but smaller than one surface of the irradiation target facing the outlet.

<12> A laser irradiation system including:
a transporting device configured to transport an irradiation target;
a laser device configured to irradiate the irradiation target with laser light;
a controlling device configured to control the laser device and the transporting device; and
the protection barrier according to any one of <1> to <11>.

What is claimed is:

1. A laser irradiation system comprising:
a transporting device configured to transport an irradiation target;
a laser device configured to irradiate the irradiation target with laser light;
a controlling device configured to control the laser device and the transporting device;
a protection barrier that surrounds a light path of the laser light irradiated by the laser device; and
a unit disposed at the protection barrier and configured to absorb or reflect regular reflection light of the laser light being deflection scanned so as to reduce an intensity of leaked laser light, leaked from a gap between the protection barrier and a side surface of the irradiation target, and
wherein when the irradiation target transported by the transporting device faces the laser device, the controlling device controls the laser device to print a visual image on the irradiation target by irradiating the laser light to the irradiation target, and
wherein the laser light is deflection scan laser light scanned by the laser device.

2. The laser irradiation system according to claim 1, wherein a visual image is printed on a recording medium disposed at a surface of the irradiation target facing the laser device, by irradiating the laser light to the recording medium.

3. The laser irradiation system according to claim 2, wherein the protection barrier includes an outlet from which the laser light is output towards an irradiation target and a size of the outlet of the protection barrier is larger than the recording medium and smaller than a surface of the irradiation target.

4. The laser irradiation system according to claim 1, wherein the protection barrier includes an outlet from which the laser light is output towards an irradiation target, and the unit configured to prevent a leakage includes a laser-reflection absorbing plate deposed at the outlet of the protection barrier.

5. The laser irradiation system according to claim 1, wherein the recording medium is a rewritable label.

6. The laser irradiation system according to claim 1, wherein the unit satisfies the following formula:

$$E2(\min)=2\times E1\times L2/L1$$

wherein E1 is a distance between laser light deflected at a maximum angle with which laser light is not incident on an inner surface of a main body of the protection barrier, and laser light parallel to the main body, E2 is a distance between laser light deflected at the maximum angle with which laser light is not incident on the inner surface of the main body of the protection barrier, and an outer peripheral edge of the main body, a first length L1 is from a first position of a galvanometer mirror of the laser device to a second position of an outlet of an edge of the protection barrier, and a second length L2 is from the second position to a third position of the side surface of the irradiation target.

7. The laser irradiation system according to claim 1, wherein the unit obstructs and absorbs primary reflection light and permits only secondary reflection light having an intensity lower than that of the primary reflection light, to be leaked outside of the system.

* * * * *